US005858451A

United States Patent [19]

Boyle

[11] Patent Number: 5,858,451
[45] Date of Patent: Jan. 12, 1999

[54] PROCESS FOR PRODUCTION OF SOLUTION-DERIVED (PB,LA)(NB,SN,ZR,TI) $O_3$ THIN FILMS AND POWDERS

[75] Inventor: Timothy J. Boyle, Albuquerque, N. Mex.

[73] Assignee: Sandia Corporation, Albuquerque, N. Mex.

[21] Appl. No.: 902,391

[22] Filed: Jul. 29, 1997

[51] Int. Cl.[6] .................................................. B05D 5/12
[52] U.S. Cl. .......................... 427/79; 427/100; 427/240; 427/294; 427/419.3; 501/134; 501/136
[58] Field of Search .............................. 427/79, 100, 240, 427/294, 419.3; 501/134, 136

[56] References Cited

U.S. PATENT DOCUMENTS

| | | | |
|---|---|---|---|
| 4,946,710 | 8/1990 | Miller et al. | 427/126.3 |
| 5,028,455 | 7/1991 | Miller et al. | 427/126.3 |
| 5,116,643 | 5/1992 | Miller et al. | 427/126.3 |
| 5,198,269 | 3/1993 | Swartz et al. | 427/226 |
| 5,308,601 | 5/1994 | Hampden-Smith et al. | 423/593 |
| 5,342,648 | 8/1994 | MacKenzie et al. | 427/126.3 |
| 5,514,822 | 5/1996 | Scott et al. | 556/28 |
| 5,516,363 | 5/1996 | Azuma et al. | 106/287.18 |

OTHER PUBLICATIONS

B. A. Tuttle, H. N. Al–Shareef, W. L. Warren, M. V. Raymond, T. J. Headley, J. A. Voigt, J. Evans and R. Ramesh, $La_{0.5}Sr_{0.5}CoO_3$ Electrode Technology for Pb(Zr, Ti)$O_3$ Thin Film Nonvolatile Memories, Microelectronic Engineering 29, pp. 223–230, 1995.

Sangeeta. D. Ramamurthi and David A. Payne, Structural Investigation of Prehydrolyzed precursors Used in the Sol–Gel Processing of Lead Titanate, J. Am. Ceram. Soc., 73(8) 2547–51 (1990).

P. Ravindranathan, S. Komarneni, A. S. Bhalla, L. E. Cross and R. Roy, Solution–Sol–Gel Processing of Lead Magnesium Niobate Thin Films, Ferroelectrics Letters, 1990, vol. 12. pp. 29–34.

R. W. Vest and W. Zhu, Films of 60/40 PZT by the MOD Process for Memory Applications, Ferroelectrics, 1991, vol. 119, pp. 61–75.

R. J. Butcher, D. L. Clark, S. K. Grumbine, R. L. Vincent–Hollis, B. L. Scott and J. G. Watkin, Ammoniacal Synthesis of lanthanum Aryloxide Complexes and Observation of a Unique Interconversion between Oxygen– and η–Arene–Bridged Dimeric Species. X–ray Crystal Structures of La+$La_2$(Oar)6($NH_3$)"(n=0,2), La(Oar)$_3$($NH_3$)$_4$ and La(Oar)$_3$($NH_3$)$_4$, and La(OAr)$_3$(THF)$_2$(Ar=2,6–)i-$Pr_2C_6H_3$), Inorg. Chem., 1995, 34, 5468.

*Primary Examiner*—Benjamin Utech
*Attorney, Agent, or Firm*—George H. Libman

[57] ABSTRACT

A simple and rapid process for synthesizing (Pb,La)(Nb,Sn, Zr,Ti)$O_3$ precursor solutions and subsequent ferroelectric thin films and powders of the perovskite phase of these materials has been developed. This process offers advantages over standard methods, including: rapid solution synthesis (<10 minutes), use of commercially available materials, film production under ambient conditions, ease of lanthanum dissolution at high concentrations, and no heating requirements during solution synthesis. For lanthanum-doped ferroelectric materials, the lanthanum source can be added with total synthesis time less than 10 minutes. Films and powders are crystallized at approximately 650° C. and exhibit ferroelectric properties comparable to films and powders produced by other techniques which require higher crystallization temperatures.

31 Claims, 2 Drawing Sheets

_PROCESS FOR PRODUCTION OF SOLUTION-DERIVED (PB,LA)(NB,SN,ZR,TI) $O_3$ THIN FILMS AND POWDERS_

This invention was made with Government support under Contract No. DE-AC04-94AL85000 awarded by the Department of Energy. The Government has certain rights in the invention.

BACKGROUND OF THE INVENTION

The present invention relates generally to the preparation of ferroelectric powders and thin films and more particularly to the preparation of solutionderived (Pb,La) (Nb,Sn,Zr,Ti) $O_3$ thin films and powders.

Due to their electrical and electromechanical properties, thin films of ferroelectric materials are of great interest for a wide range of applications from nonvolatile random access memories (NVRAMs) to micro-electrical mechanical devices, to integratable capacitors. Ferroelectric materials are those that possess a spontaneous polarization that can be reoriented with an applied electric field. This leads to hysteresis in the polarization-voltage response and is the basis for NVRAM applications. The most widely studied class of ferroelectric thin films is based on the perovskite crystal structure of the lead zirconate titanate [$Pb(Zr_{1-x},Ti_x)$ $O_3$; PZT] family. Aliovalent cations (aliovalent indicates a dopant that has a different valence than the ion it was replacing, either higher or lower) are typically substituted for the A-site (Pb) and B-site (Zr,Ti) cations to modify the solid-state point defect chemistry and, thus, the electrical properties of the material. Lanthanum, an A-site donor, ($La^{+3}$ substitutes for $Pb^{+2}$) is used to reduce the coercive (switching voltage) and improve the dielectric constant, and reduced fatigue. Niobium and tin are B-site donor dopants (for example, $Nb^{5+}$ substitutes for $Ti^{4+}$ or $Zr^{4+}$) and are typically used to reduce the coercive (switching) voltage and improve the insulation resistance of PZT thin films (see Tuttle, B. A.; Al-Shareef, H. N.; Warren, W. L.; Raymond, M. V.; Headley, T. J.; Voigt, J. A. *Microelectronic Engineering*, 1995, 29, 223).

Solution routes are widely used for the production of thin films through spin-cast or dip-coating methodologies. These methods are typically used due to the flexibility in the stoichiometry of precursor solutions, the ease of altering processing variables, cost effectiveness (inexpensive), the reduction of the sintering temperatures, and the integratability with existing semi-conductor processes.

The solution methodologies for the preparation of undoped and doped PZT precursor solutions can be divided into three general categories: metallo-organic decomposition (MOD), solution gelation (sol-gel) or hybrids. Both metallo-organic (MOD) routes which utilize large "soap-like" derivatives and the so-called "sol-gel" routes have been extensively studied.

Vest and Zhu (*Ferroelectrics*, 1991, 119, 61) describe an MOD process for preparing PZT materials by dissolving lead, zirconium, and titanium precursor compounds in xylene to produce a precursor solution which was then decomposed to subsequently produce the ferroelectric material.

Hampden-Smith, in U.S. Pat. No. 5,308,601 issued on May 3, 1994, also describes an MOD method for making metal oxides at low temperatures. Because of the problems associated with achieving adequate solubility, the method of Hampden-Smith requires synthesis of the starting materials as well as acid modification of all precursors and the addition of water.

The "sol-gel" routes which use 2-methoxyethanol or other "chelating" reagents [i.e., the Inverted Mixing Order (IMO) method] typically involve altering the commercially available starting materials through the use of alcohol or acid solvents at elevated temperatures. Sol-gel processing generally suffers from limitations due to the relative solubilities of the various metals salts and metal alkoxides. Furthermore, controlling the stoichiometric ratios of two or more metals or metal oxides using sol-gel processing is complicated by the differing hydrolysis or precipitation rates of the precursors. Therefore, the starting materials are often modified to permit adequate solubility, adding processing steps to the method. These methods generally require synthesis of novel starting materials, relatively long mixing times, and/or heating during preparation of the desired precursor solutions. Furthermore, incorporation of lanthanum cations into the starting solutions is not easily accomplished, especially at higher La contents.

Ramamurthi and Payne (*J. Am. Ceram. Soc.*, 1990, 73, 2547) describe a sol-gel method for making PT and PZT materials using alkoxides and acetates prepared in a methoxyethanol solvent system. The processing requires several hours as well as multiple processing steps to get the metal compounds in solution. These steps include refluxing at elevated temperature and hydrolysis.

Ravindranathan et al. (*Ferroelectric Letters*, 1990, 12, 29) describe a sol-gel process similar to that of Ramamurthi and Payne for making lead magnesium niobate. They also use methoxyethanol as the solvent system and require heating for several hours as well as hydrolysis of the precursor solution.

Miller et al., in U.S. Pat. No. 5,116,643, issued on May 26, 1992, as well as in U.S. Pat. No. 4,946,710 issued on Aug. 7, 1990, and in U.S. Pat. No. 5,028,455 issued on Jul. 2, 1991, describe a sol-gel method for producing ferroelectric thin films using alcohol and acid solvents in proportions sufficient to ensure equal reaction rates. However, Miller et al. also require heating to drive off the solvent, the addition of further reagents to quench reactivity and the introduction of water to hydrolyze the produced precursors.

Improvements to the preparation of PZT-family materials by these methods would be to reduce the preparation or synthesis time, to prepare the ferroelectric materials using commercially-available starting materials, and to reduce the severity of the preparation conditions, particularly the severity of the heating conditions. Once the precursor solutions have been prepared, either thin films or powders can be prepared by standard methods.

SUMMARY OF THE INVENTION

According to the present invention, a solution synthesis method is provided wherein ferroelectric materials precursor solutions are produced without heating. The ferroelectric materials produced are from the PZT family of materials with donor ions of lanthanum (L), tin (S), and niobium (N). Ferroelectric materials that can be produced include PT, PZT, and all combinations with one or more metal donor cations from L, S, and N. The present invention overcomes many difficulties in producing these ferroelectric materials that require modification of starting materials, long synthesis times, heating of the reaction, and solubilization of the metal precursors.

According to one embodiment of the present invention, the solution method comprises solubilizing a lead compound in an amine solvent to form a first solution, forming a second solution by adding a titanium compound and x moles of a zirconium compound to a second solvent, wherein $x \geq 0$; and then combining said first solution with said second solution to yield a ferroelectric-material precursor solution. If $x=0$, a PT precursor solution is formed; if $x>0$, a PZT precursor solution is formed. The ferroelectric PT or PZT precursor solution can then be used to form the mixed-metal oxide ferroelectric powders and thin films.

In another embodiment of the present invention, combinations of tin, niobium, and lanthanum are added to the PT or PZT precursor solutions to produce PLNSZT precursor solutions.

In another embodiment of the present invention, precursor ferroelectric powders are produced by removal of all the volatile materials from the desired precursor solutions through vacuum distillation (at about $1 \times 10^{-3}$ Torr).

In another embodiment of the present invention, single- or multi-layered films of ferroelectric precursors are spin-coat deposited onto substrates using a photoresist spinner, (at approximately 3000 rpm for about 30 sec). After each deposition, the films are baked (at approximately 300° C. for approximately 5 min) and allowed to cool to room temperature for about 5 min before introduction of the next layer.

Both powders and films are converted from the metallo-organic species to the mixed-metal oxide ferroelectric material by sintering under ambient atmosphere. Sintering can be done by ramping from room temperature to approximately 650° C. using a ramp rate of approximately 20° C./min and holding at about 650° C. for about 30 minutes.

DETAILED DESCRIPTION OF THE INVENTION

The most widely studied class of ferroelectric thin films is based on the perovskite crystal structure of the lead zirconate titanate $[Pb(Zr_{1-x},Ti_x)O_3;$ PZT] family. PZT is an abbreviation for lead zirconate titanate, a ferroelectric material in the crystalline form. PT, lead titanate, is also a ferroelectric material. Various cations can be substituted for elements in the PZT precursor material to form other ferroelectric materials. Lanthanum, an A-site cation, can be substituted for lead, another A-site cation. Niobium and tin, B-site cations, can substitute for either zirconium or titanium. Therefore, lanthanum can be added to produce PLZT, an abbreviation for lanthanum-doped lead zirconate titanate, a ferroelectric material in the crystalline form. Alternatively, no zirconium is required to form PLT, an abbreviation for lanthanum-doped lead titanate, a ferroelectric material in the crystalline form. Niobium can be added to the general PZT precursor material to form a PNZT precursor material. Tin can be added to a PZT precursor material to form a PSZT precursor material. Both tin and niobium can be added to the PZT precursor material to form a PNSZT precursor material. Lanthanum, tin and niobium can all be added to the PZT precursor material to form a PLNSZT precursor material or added to the PT precursor material to form a PLNST precursor material.

Figure 1:
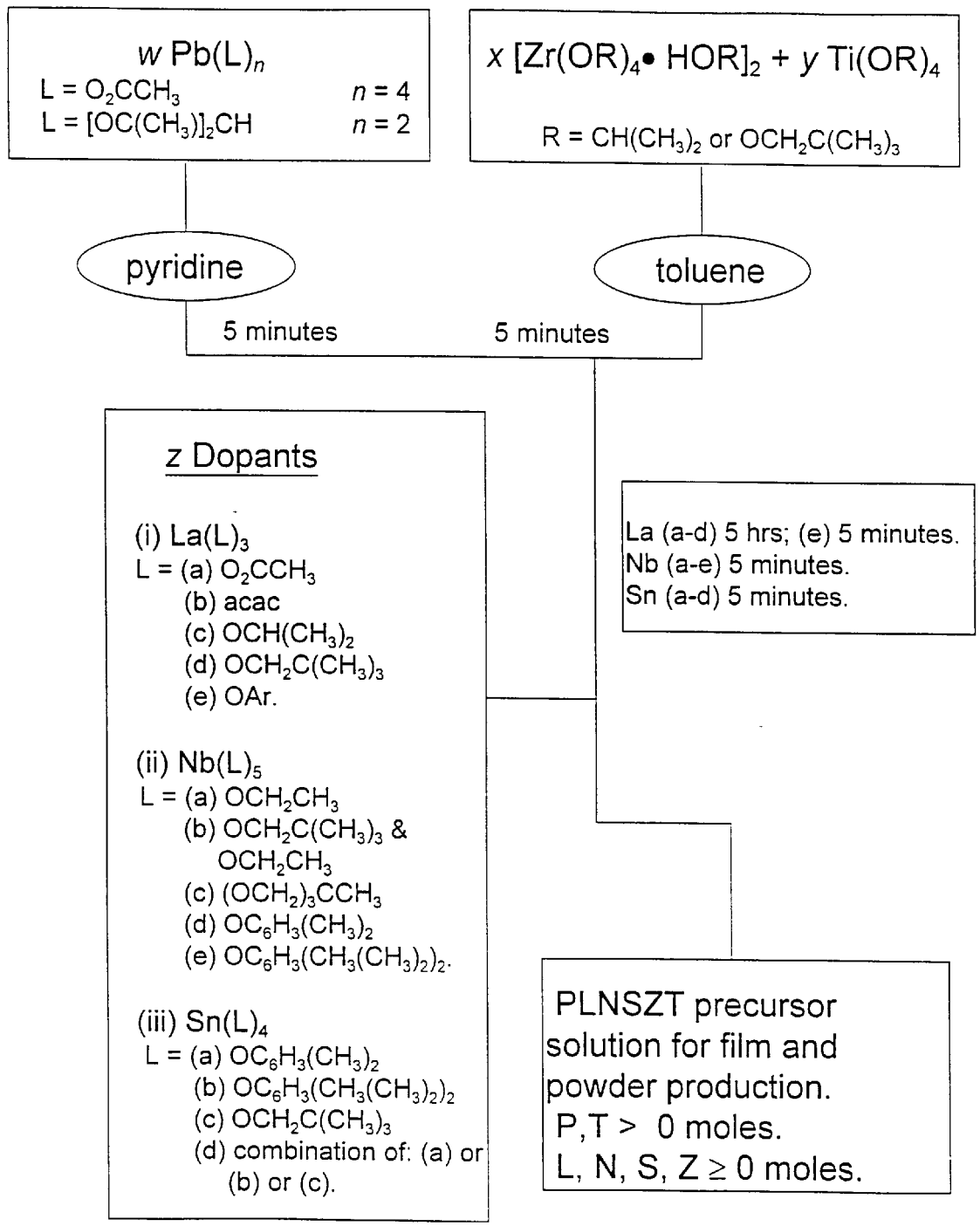
FIG. 1 shows the general solution synthesis method for the PZT-family of precursor solutions with donor lanthanum, tin, and niobium dopants.

According to the present invention, a preferred synthesis method or process to generate the precursor solution for these ferroelectric materials is illustrated in FIG. 1. This is a precursor solution preparation for all of the discussed ferroelectric materials, with the amounts of the starting lead, zirconium, titanium, lanthanum, tin, and niobium materials able to be varied to achieve any of the various precursor solutions. Although FIG. 1 shows the addition of lanthanum, tin, and niobium after preparation of the PT or PZT precursor material, these dopant materials can be added to any of the precursor solutions to obtain the final precursor solution.

Once the precursor solution has been prepared, a precursor powder or thin film can be obtained using standard techniques. The precursor powder or thin film is then converted from the metallo-organic species to the mixed-metal oxide material by sintering. This process forms the perovskite phase of the material which is required for the material to be a suitable ferroelectric material.

To prepare a PT or PZT precursor solution, a lead compound is mixed in an amine solvent, preferably pyridine, 1-methylimidizole, dimethylformamide, or diethylamine, to form a first solution. The use of an amine solvent is an important part of the invention as it reduces the time for synthesis of the precursor solutions by increasing the solubility of the synthesis materials. Excess lead, typically approximately 10%, is used to compensate for volatility effects. The solutions are preferentially generated under dry conditions, such as in an argon or nitrogen atmosphere, to better control the final film properties. For the PZT precursor solution, a zirconium compound is then mixed with a titanium compound in solution in a separate container and dissolved in an aromatic hydrocarbon solvent, preferably toluene or xylene. For the PT precursor solution, the titanium compound is dissolved by itself in the aromatic hydrocarbon solvent. An aromatic solvent is used to reduce the synthesis time by increasing the solubility of the zirconium and titanium compounds. This second solution is mixed with the first solution, with agitation such as stirring, until complete dissolution of the lead precursor occurs. This generally occurs within approximately 5 minutes.

At this point, if PZT or PT material is desired, the precursor solution can be used for either powder or thin film synthesis. If a material containing lanthanum, tin or niobium is desired, lanthanum, tin and niobium compounds are added to the precursor solution in the desired stoichiometric proportions and stirred or otherwise agitated until completely dissolved. This precursor solution can now be used for either powder or thin film synthesis.

Powders are produced by removal of all the volatile materials from the desired precursor solutions through vacuum distillation (at about $1 \times 10^{-3}$ Torr). Multi-layered films are produced by spin-coat deposition, in air, onto substrates, such as Pt-coated $SiO_2/Si$ substrates, using a photoresist spinner, at approximately 2000–3000 rpm and preferentially at about 3000 rpm, for about 30 sec. Other substrates may be used. After each deposition, the films are baked on a hot plate (at approximately 300° C. for approximately 5 min) and allowed to cool to room temperature for about 5 min before introduction of the next layer.

Both powders and films are converted from the metallo-organic species to the mixed-metal oxide ferroelectric material by sintering, such as in a tube furnace, under ambient atmosphere conditions in air or an oxygen environment. Sintering can be done by ramping from room temperature to approximately 650° C. using a ramp rate of approximately 20° C./min and holding at about 650° C. for about 30 minutes.

The quantity of starting compounds used in the synthesis of the PLNSZT ferroelectric material is dependent upon the desired characteristics of the product ferroelectric material. For ferroelectric materials, the total number of A site cations and B site cations must be equal. With the lead and lanthanum A-site cations designated as 100, the ratio of the B-site cations for Ni, Sn,Zr and Ti material must also add up to 100. The stoichiometry of any particular ferroelectric material composition is expressed by the "lanthanum/niobium/tin/zirconium/titanium" content in the resulting product. The expression L/N/S/Z/T, as in 5/5/5/30/60, for example, is shorthand for expressing % Pb+% La=100=% Nb+% Sn+% Zr+% Ti, where percentage is based on atomic percent or mole ratio of atoms. A 5/30/70 PLZT consists of a PLZT material with a ratio of 95 atoms Pb and 5 atoms La to 30 atoms Zr and 70 atoms Ti. If PZT 40/60 is the desired product, then zirconium is in 40% and the titanium is in 60% of the B-site cations. In PLZT 5/30/70, the La is an A-site cation, so the Pb is 95% and the La is 5% of the A-sites while Zr is 30% and Ti is 70% of the B-sites. In PLNZT 5/5/25/70, Pb is 95% and La is 5% of the A-sites while Nb is 5%, Zr is 25%, and Ti is 70% of the B-sites. The stoichiometry of the starting materials is chosen to produce this product, with all of the materials quantitatively going into the product.

Several important results regarding the chemistry of the present process should be emphasized before discussing the film properties. First, due to the high solubility of lead precursors in amine solvent, no external heating or complicated modifications of commercially available materials is required. Films produced using $Pb(OAc)_4$ are of higher quality those made from $Pb(acac)_2$; therefore, all data presented is for films prepared with $Pb(OAc)_4$. In addition, all film properties presented here were measured on samples fabricated from solutions which have been prepared in dry atmosphere. Precursor solutions can be prepared under ambient atmospheric conditions, using starting materials that have been stored for long period of times at ambient atmosphere and can be used to produce thin films with acceptable ferroelectric properties. However, it is preferable to store the precursors and prepare the solutions under dry conditions for more controllable film properties and only these films will be discussed further.

As mentioned earlier, a number of commercially available lanthanum containing materials can be incorporated into the present invention method, without heating. These precursors include $La(OPr^i)_3$, $La(OAc)_3$, $La(acac)_3$, and $La(ONep)_3$; however, these compounds typically take over 5 hours to completely dissolve in our solvent mixture. In comparison, $La(OAr)_3$ rapidly dissolves, without external heating, dramatically reducing preparation times. For instance, PZT precursor solutions doped at 20 mole % of lanthanum were completely synthesized in <10 min.

Various niobium and tin precursor compounds were used and ferroelectric thin films were produced with similar ferroelectric hysteresis characteristics. These compounds included niobium ethoxide, niobium neo-pentoxide, mixtures of niobium ethoxide and neo-pentoxide, niobium tris-hydroxymethyl propane, niobium dimethylaryl oxide, niobium di-isopropylaryl oxide, stannic neo-pentoxide, stannic dimethylaryl oxide, and stannic di-isopropylaryl oxide. Mixtures or combinations of these precursor compounds can also be used to obtain the desired ferroelectric material.

Using the method of this invention, high quality ferroelectric films of PZT-family materials are prepared at processing temperatures as low as 650° C. These PZT-family materials can be doped with lanthanum, niobium and tin. PLNSZT materials can thus be formed, where the amount of lanthanum, niobium, tin, or zirconium in the final product are greater than or equal to zero. The lower crystallization temperatures for these ferroelectric compositions is believed to be due to the combination of small ligand size, the strong Lewis basic pyridine solvent, and the rapid synthesis time. The latter two qualities ensures limited chemical interaction between the components of the solution. This guarantees that less rearrangement is required to convert the metallo-organic complexes to the desired metal oxide phase and thus lower the processing temperatures.

Grazing incidence X-ray diffraction was used to confirm the phase purity of the final ferroelectric films and powders. Scanning electron microscopy (SEM) was used to examine the microstructure. In order to measure the electrical properties, top platinum electrodes (150 mm in diameter) were deposited using a shadow mask to create a parallel-plate capacitor geometry. The ferroelectric properties of the $(Pb,La)(Zr,Ti)O_3$ materials were measured using an RT66A ferroelectric tester from Radiant Technologies. The dielectric properties were measured using an HP 4194A impedance analyzer.

There are structural differences in the ferroelectric films made by the present invention compared with films made by the IMO process. For example, the PZT 40/60 film appears to be non-uniform with a wide grain size distribution that ranges from 0.1 mm to as much as 1 mm in size. In comparison, PZT 40/60 films prepared using the IMO process have smaller grain sizes (0.2 mm) and are more uniform. Despite the differences in the microstructure, the electrical properties are comparable for the two PZT 40/60 films. PLT 10/100 thin films prepared using the method of the present invention have grain sizes ranging from 0.6 to 0.9 mm. In contrast, IMO-prepared PLT 12/100 films have ~0.1 mm sized grains. The grain size of PLZT 5/30/70 films prepared by the method of the present invention are approximately 0.3 mm in size. PLZT films generated from the IMO process have a substantially different microstructure and are not comparable.

Figure 2:
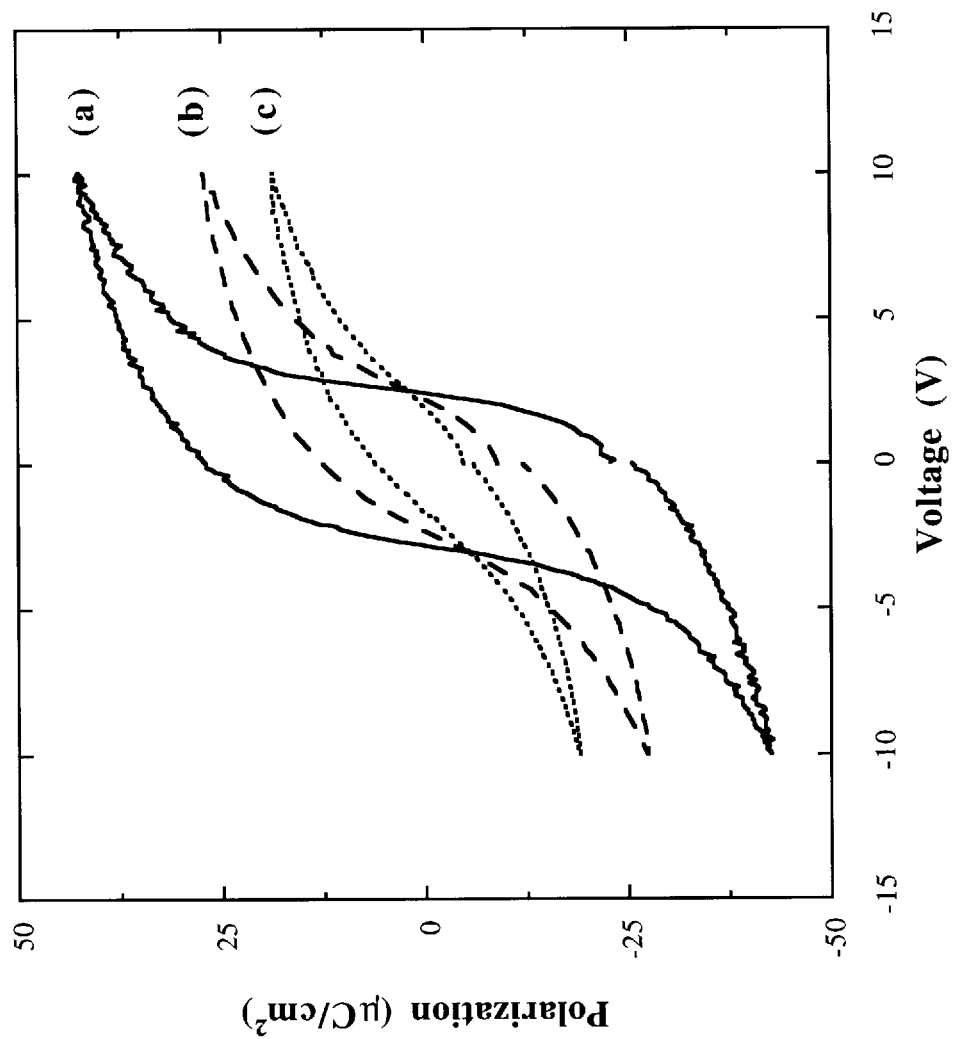
FIG. 2 shows typical hysteresis curves for PZT 40/60, PLZT 5/30/70, PLT 10/100 and PNZT thin film capacitors.

For the present method, the average grain size for the PLT 10/100 films is larger than that of the PLZT 5/30/70 films. This is believed to occur because the increase in lanthanum content reduces the nucleation site density which increases the film's crystallization temperature. For PZT thin films, it is also known that an increase in titanium content yields smaller grain sizes. This suggests that the amount of La dopant, in comparison to the Ti content, strongly influences the final grain size in the processed films. However, ferroelectric properties are comparable and acceptable. FIG. 2 shows typical hysteresis curves for some of the PLNSZT materials prepared, demonstrating that ferroelectric properties are achieved.

EXAMPLES

Solution preparation

The precursor solutions are preferentially generated under dry (argon) conditions to better control the final film properties. Toluene (Aldrich), xylene, or other aromatic solvents, and pyridine (py, Aldrich), pyridine, 1-methylimidizole, dimethylformamide, or diethylamine or other amine solvents, are dried over and freshly distilled from sodium naphthalide, and $CaH_2$, respectively. The following compounds were used as received: lead tetra-acetate (Aldrich, $Pb(OAc)_4$), lead acetylacetonate (Alfa, $Pb(acac)_2$), titanium iso-propoxide (Aldrich, $Ti(OPr^i)_4$), and zirconium iso-propoxide complex (Aldrich, $Zr(OPr^i)_4$ or $Zr[(OCH(CH_3)_2)_4 \cdot HOCH(CH_3)_2]_2$), lanthanum iso-propoxide (Alfa, $La(OPr^i)_3$), lanthanum acetate (Aldrich, $La(OAc)_3$), lanthanum acetylacetonate ($La(acac)_3$, Alfa), niobium ethoxide and stannic ethoxide. Niobium di-isopropylaryl oxide, niobium neo-pentoxide, niobium tris-hydroxymethylpropane, niobium dimethylaryl oxide, stannic di-isopropylaryl oxide, and stannic niobium dimethylaryl oxide were synthesized. The compounds lanthanum neo-pentoxide (La(ONep)$_3$) and lanthanum 2,6-bis(iso-propyl)aryloxide (La(OAr)$_3$) are prepared according to the method of R. J. Butcher, D. L. Clark, S. K. Grumbine, R. L. Vincent-Hollis, B. L. Scott and J. G. Watkin (*Inorg. Chem.*, 1995, 34, 5468), which is incorporated herein by reference.

Example 1
PT or PZT Precursor Synthesis

A first solution is synthesized by addition of the lead precursor, lead tetraacetate, Pb(OAc)$_4$, or lead acetylacetonate, Pb(acac)$_2$, to the amine solvent, in this case pyridine, with stirring for approximately 5 minutes. To generate a 50 mL batch of PZT 40/60, 10.7 g of Pb(OAc)$_4$ or 9.3 g of Pb(acac)$_2$ is dissolved in 29.34 g of pyridine. A small excess of lead, approximately 10%, is used to account for volatility losses. A second mixture, prepared in a separate flask, is formed by adding titanium iso-propoxide, Ti(OPr$^i$)$_4$, in this example 3.41 g, to a zirconium iso-propoxide complex, Zr(OPr$^i$)$_4$·HOCH(CH$_3$)$_2$]$_2$ (3.1 g) and stirring until a slurry forms (approximately 5 minutes), followed by dissolution in toluene (4.32 g). If no zirconium compound is added, a PT precursor solution will be formed. Other aromatic solvents, such as xylene, can be used. Combining these two mixtures yields a yellow ternary solution which is stirred until complete dissolution of the Pb precursor occurs (<5 minutes). At this point, this ternary precursor solution can be used for either film or powder synthesis of PZT.

Example 2
PZT Precursor Synthesis with various Amine Solvents

The use of an amine solvent is an important part of the present invention because it allows the lead, zirconium, titanium, and other metal dopant precursor compounds to be mixed in solution to form the ferroelectric precursor solution. Example 1 demonstrated that pyridine can be used to solubilize the lead precursor compound, as well as the added metal precursor compounds. In this example, a first solution is synthesized by addition of the lead precursor, lead tetraacetate, Pb(OAc)$_4$, or lead acetylacetonate, Pb(acac)$_2$, to the amine solvent, in this case either 1-methylimidizole, dimethylformamide, or diethylamine, with stirring for approximately 5 minutes. To generate a PZT 40/60 precursor ferroelectric solution, 0.975 g of Pb(OAc)$_4$ is dissolved in 3 mL of either, 1-methylimidizole, dimethylformamide, or diethylamine. A small excess of lead, approximately 10%, is used to account for volatility losses. A second mixture, prepared in a separate flask, is formed by adding titanium iso-propoxide, Ti(OPr$^i$)$_4$, in this example 0.341 g, to a zirconium iso-propoxide complex, Zr(OPr$^i$)$_4$·HOCH(CH$_3$)$_2$]$_2$ (0.31 g) and stirring until a slurry forms (approximately 5 minutes), followed by dissolution in toluene (0.5 mL). Combining these two mixtures yields a ternary solution which is stirred until complete dissolution of the Pb precursor occurs (<5 minutes). At this point, this ternary precursor solution can be used for either film or powder synthesis of PZT.

Example 3
PLZT Precursor Synthesis

The PLZT precursor solution is synthesized by generating a PZT precursor solution as in Example 1 or 2, followed by addition of the lanthanum precursor compound and stirred until complete dissolution has occurred. The mixing time required to completely dissolve the lanthanum (La) precursors without heating is approximately 5 hours for La(OAc)$_3$, La(acac)$_3$, La(OPr$^i$)$_3$ and La(ONep)$_3$. In contrast, the La(OAr)$_3$ complex is rapidly soluble at any level of doping, generally solubilizing in a few minutes. At this point, this precursor solution can be used for either film or powder synthesis of PLZT. To generate a 10 mL solution of PLZT 5/40/60, 1.77 g of Pb(OAc)$_4$ or 1.77 g of Pb(acac)$_2$ is dissolved in 8 mL of pyridine. A second mixture, prepared in a separate flask, is formed by adding titanium iso-propoxide, Ti(OPr$^i$)$_4$, in this example 0.68 g, to a zirconium iso-propoxide complex, Zr(OPr$^i$)$_4$·HOCH(CH$_3$)$_2$]$_2$ (0.62 g) and stirring until a slurry forms (approximately 5 minutes), followed by dissolution in toluene (2 mL). A lanthanum compound is added and dissolved without heating (0.13 g La(OAc)$_3$ for ~5 hrs; or 0.17 g La(acac)$_3$ for ~5 hrs; or 0.13 g La(OPr$^i$)$_3$ for ~5 hrs; or 0.26 g La(OAr)$_3$ for ~5 minutes.

Example 4
PLT Precursor Synthesis

A first solution is synthesized by addition of the lead precursor Pb(OAc)$_4$ [or Pb(acac)$_2$] to pyridine, with stirring. A second solution, prepared in a separate flask, is formed by dissolving Ti(OPr$^i$)$_4$ in toluene. Combining these two solutions yields a precursor solution which is stirred until complete dissolution of the Pb precursor occurs (<5 minutes). A lanthanum precursor compound is added and stirred until complete dissolution. The mixing time required to completely dissolve the La precursors without heating is approximately 5 hours for La(OAc)$_3$, La(acac)$_3$, La(OPr$^i$)$_3$ and La(ONep)$_3$. In contrast, the La(OAr)$_3$ complex is instantly soluble at any level of doping. At this point, this precursor solution can be used for either film or powder synthesis of PLT. To produce PLT 10/100, 0.932 g of Pb(OAc)$_4$ in 2.9 mL of pyridine, 0.568 g of Ti(OPr$^i$)$_4$ in 0.5 mL of toluene, and 0.134 g of La(OAr)$_3$ were used.

Example 5
PNZT Precursor Synthesis

The PNZT precursor solution is synthesized by generating a PZT precursor solution as in Example 1 or 2, followed by addition of the niobium precursor compound and stirred until complete dissolution has occurred. Alternatively, the niobium precursor is added to the lead precursor solution or to the zirconium and titanium precursor solution. At this point, this precursor solution can be used for either film or powder synthesis of PNZT. To produce PNZT 4/48/48 (100% Pb for the A-sites, 4% Nb, 48% Zr and 48% Ti for B-sites), 1.613 g of Pb(OAc)$_4$ in 4.694 g of pyridine, 0.595 g of Zr(OPr$^i$)$_4$ and 0.437 g of Ti(OPr$^i$)$_4$ in 0.692 mL of toluene, and 0.125 g of niobium di-isopropylaryl oxide, Nb[(OC$_6$H$_3$(CH(CH$_3$)$_2$)$_2$]$_5$, were used. Niobium ethoxide, niobium neo-pentoxide, niobium tris-hydroxymethylpropane and niobium dimethylaryl oxide were also used as the niobium precursor compound and produced similar materials.

Example 6
PSZT Precursor Synthesis

The PSZT precursor solution is synthesized by generating a PZT precursor solution as in Example 1 or 2, followed by addition of the tin precursor compound and stirred until complete dissolution has occurred. Alternatively, the tin precursor is added to the lead precursor solution or to the zirconium and titanium precursor solution. At this point, this precursor solution can be used for either film or powder synthesis of PSZT. To produce PSZT 13.5/81.5/5 (100% Pb for the A-sites, 13.5% Sn, 81.5% Zr and 5% Ti for B-sites), 0.821 g of Pb(OAc)$_4$ in 2.347 g of pyridine, 0.506 g of Zr(OPr$^i$)$_4$ and 0.023 g of Ti(OPr$^i$)$_4$ in 0.346 g of toluene, and 0.179 g of Sn[(OC6H$_3$(CH(CH$_3$)$_2$)$_2$]$_4$, were used. Stannic neo-pentoxide and stannic dimethylaryl oxide were also used as the tin precursor compound and produced similar materials.

Example 7
Thin Film Formation of the Ferroelectric Material Precursors

Multi-layered films of the ferroelectric material precursors from Examples 1–6 were spin-coat deposited, in air, onto Pt-coated SiO$_2$/Si substrates using a photoresist spinner, (at approximately 3000 rpm for about 30 sec). Other substrates may be used. After each deposition, the films were baked on a hot plate (at approximately 300° C. for approximately 5 min) and allowed to cool to room temperature for about 5 min before introduction of the next layer.

Example 8
Powder Formation of Ferroelectric Material Precursors

Precursor ferroelectric material powders were produced by removal of all the volatile materials from the desired precursor solutions from Examples 1–6 through vacuum distillation (at about 1×10$^{-3}$ Torr).

Example 9
Ferroelectric Material Production

Both powders and films are converted from the metalloorganic species from Examples 7 and 8 to the mixed-metal oxide ferroelectric material by sintering in a tube furnace under ambient atmosphere. Sintering can be done by ramping from room temperature to approximately 650° C. using a ramp rate of approximately 20° C./min and holding at about 650° C. for about 30 minutes.

Although the invention has been described with respect to particularly preferred embodiments, modifications obvious to one of ordinary skill in the art are contemplated to be within the scope of the invention.

I claim:

1. A method for making a ferroelectric-material precursor solution, comprising,
    solubilizing a lead compound in an amine solvent to form a first solution;
    forming a second solution by adding a titanium compound and x moles of a zirconium compound to a second solvent, wherein x≧0; and
    combining said first solution with said second solution to yield a ferroelectric-material precursor solution.

2. The method according to claim 1, wherein the ferroelectricmaterial precursor solution further contains at least one precursor compound selected from the group consisting of a lanthanum precursor compound, a niobium precursor compound, and a tin precursor compound to produce another ferroelectric-material precursor solution.

3. The method according to claim 2, wherein the lanthanum precursor compound comprises a compound selected from the group consisting of lanthanum acetate, lanthanum iso-propoxide, lanthanum acetylacetonate, lanthanum neopentoxide, and lanthanum 2,6-bis(isopropyl)aryloxide or a combination thereof.

4. The method according to claim 2, wherein the niobium precursor compound comprises a compound selected from the group consisting of niobium ethoxide, niobium neopentoxide, niobium tris-hydroxymethylpropane, niobium 2,6-bis(dimethyl)aryloxide, and niobium 2,6-bis(isopropyl) aryloxide or a combination thereof.

5. The method according to claim 2, wherein the tin precursor compound comprises a compound selected from the group consisting of stannic 2,6-bis(dimethyl)aryloxide, stannic 2,6-bis(isopropyl)aryloxide, stannic neo-pentoxide, and combination thereof.

6. The method according to claim 2, further comprising the steps of:
    removing essentially all volatile material through vacuum distillation to form a powder; and
    sintering said powder to produce a mixed-metal oxide, ferroelectric material.

7. The method according to claim 6, wherein the sintering is done by heating the powder under ambient atmosphere from about room temperature to about 650° C., maintaining the temperature of about 650° C. for about 30 minutes, and allowing the powder to cool.

8. The method according to claim 6, wherein the vacuum distillation is performed at approximately 0.001 Torr.

9. The method according to claim 2, further comprising the step of producing a thin film by spin cast deposition of the precursor solution in air at approximately 3000 rpm for about 30 sec.

10. The method according to claim 9, wherein the step of producing the thin film comprises spin-cast deposition of the thin film in successive layers, one on top of the other, each layer being heat treated under ambient atmosphere at about 300° C. for about 5 min. and allowed to cool before deposition of the next layer.

11. The method according to claim 9, further comprising the step of sintering said thin film to produce the mixed-metal oxide, ferroelectric material.

12. The method according to claim 11, wherein the sintering is done by heating the powder under ambient atmosphere from about room temperature to about 650° C., maintaining the temperature of about 650° C. for about 30 minutes, and allowing the powder to cool.

13. The method according to claim 1, wherein the solutions are prepared under dry conditions.

14. The method according to claim 1, wherein the lead compound comprises a compound selected from the group consisting of lead tetra-acetate, lead acetylacetonate and a mixture thereof.

15. The method according to claim 1, wherein said amine solvent is selected from the group consisting of pyridine, 1-methylimidizole, dimethylformamide and diethylamine.

16. The method according to claim 1, wherein the titanium compound is a titanium alkoxide.

17. The method according to claim 16, wherein the titanium compound is either titanium iso-propoxide or neopentoxide.

18. The method according to claim 17, wherein the zirconium isopropoxide complex is Zr[(OCH(CH$_3$)$_2$)$_4$·HOCH(CH$_3$)$_2$]$_2$.

19. The method according to claim 1, wherein the zirconium compound is a zirconium alkoxide.

20. The method according to claim 19, wherein the zirconium compound is a zirconium iso-propoxide complex.

21. The method according to claim 1, wherein the second solvent is an aromatic hydrocarbon solvent.

22. The method according to claim 1, wherein the aromatic hydrocarbon is selected from the group consisting of toluene and xylene.

23. The method according to claim 1, further comprising the steps of:
    removing essentially all volatile material through vacuum distillation to form a powder; and
    sintering said powder to produce a mixed-metal oxide, ferroelectric material.

24. The method according to claim 23, wherein the sintering is done by heating the powder under ambient atmosphere from about room temperature to about 650° C., maintaining the temperature to about 650° C. for about 30 minutes, and allowing the powder to cool.

25. The method according to claim 23, wherein the vacuum distillation is performed at approximately 0.001 Torr.

26. The method according to claim 1, further comprising the step of producing a thin film by spin cast deposition of the precursor solution in air at approximately 3000 rpm for about 30 sec.

27. The method according to claim 26, wherein the step of producing the thin film comprises spin-cast deposition of the thin film in successive layers, one on top of the other, each layer being heat treated under ambient atmosphere at about 300° C. for about 5 min. and allowed to cool before deposition of the next layer.

28. The method according to claim 27, wherein the sintering is done by heating the powder under ambient atmosphere from about room temperature to about 650° C., maintaining the temperature of about 650° C. for about 30 minutes, and allowing the powder to cool.

29. The method according to claim 26, further comprising the step of sintering said thin film to produce the mixed-metal oxide, ferroelectric material.

30. A method for making a ferroelectric-material precursor solution, comprising, solubilizing a lead compound in an amine solvent to form a first solution;

forming a second solution by adding a titanium compound and x moles of a zirconium compound to a second solvent, wherein $x \geq 0$;

combining said first solution with said second solution to yield a ferroelectric-material precursor solution;

adding at least one precursor compound selected from the group consisting of a lanthanum precursor compound, a niobium precursor compound, and a tin precursor compound to produce another ferroelectric-material precursor solution;

removing essentially all volatile material through vacuum distillation to form a powder; and sintering said powder to produce a mixed-metal oxide, ferroelectric material.

31. A method for making a ferroelectric-material precursor solution, comprising, solubilizing a lead compound in an amine solvent to form a first solution;

forming a second solution by adding a titanium compound and x moles of a zirconium compound to a second solvent, wherein $x \geq 0$;

combining said first solution with said second solution to yield a ferroelectric-material precursor solution;

adding at least one precursor compound selected from the group consisting of a lanthanum precursor compound, a niobium precursor compound, and a tin precursor compound to produce another ferroelectric-material precursor solution;

producing a thin film by spin cast deposition of the precursor solution in air at approximately 3000 rpm for about 30 seconds; and sintering said thin film to produce a mixed-metal oxide, ferroelectric material.

* * * * *